United States Patent
Bhattacharya et al.

(10) Patent No.: US 7,548,824 B2
(45) Date of Patent: Jun. 16, 2009

(54) AUTOMATED ANALYSIS SYSTEM FOR SEMICONDUCTOR MANUFACTURING FABRICATION

(75) Inventors: Sutirtha Bhattacharya, Hillsboro, OR (US); Brenda Buttrick, Portland, OR (US); David Eggleston, Hillsboro, OR (US); Ayman Fayed, Beaverton, OR (US); Raj Mohan, Santa Clara, CA (US); Girish Nirgude, Hillsboro, OR (US); Sanjay Patel, Union City, CA (US); Ashit Sawhney, Fremont, CA (US); Raghu Yeluri, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 491 days.

(21) Appl. No.: 11/476,535

(22) Filed: Jun. 27, 2006

(65) Prior Publication Data

US 2007/0299634 A1 Dec. 27, 2007

(51) Int. Cl.
G06F 15/00 (2006.01)
G06F 19/00 (2006.01)

(52) U.S. Cl. ....................................... 702/81
(58) Field of Classification Search .............. 702/81
See application file for complete search history.

(56) References Cited

U.S. PATENT DOCUMENTS

| | | | | |
|---|---|---|---|---|
| 6,832,227 | B2* | 12/2004 | Seki et al. | 707/101 |
| 6,850,854 | B2* | 2/2005 | Naya et al. | 702/81 |
| 7,185,192 | B1* | 2/2007 | Kahn | 713/155 |
| 2003/0140132 | A1* | 7/2003 | Champagne et al. | 709/220 |
| 2005/0216662 | A1* | 9/2005 | Sunderland et al. | 711/114 |
| 2006/0009942 | A1* | 1/2006 | Keck et al. | 702/122 |
| 2007/0168461 | A1* | 7/2007 | Moore | 709/217 |
| 2008/0301666 | A1* | 12/2008 | Gordon et al. | 717/172 |

* cited by examiner

*Primary Examiner*—Michael P. Nghiem
*Assistant Examiner*—Cindy H Khuu
(74) *Attorney, Agent, or Firm*—Blakely, Sokoloff, Taylor & Zafman LLP

(57) ABSTRACT

A system and method for an automated analysis system for semiconductor manufacturing fabrication is disclosed. The system includes one or more site databases that each store data generated by an associated one or more semiconductor fabrication plants, a configuration database, and a server communicatively coupled to the one or more site databases and the configuration database, the server to analyze the data from the one or more site databases upon a request by a client, the data to be analyzed based on configuration settings in the configuration database that provide uniform configuration synchronization for applying algorithms to the data.

7 Claims, 8 Drawing Sheets

AUTOMATED ANALYSIS SYSTEM FOR SEMICONDUCTOR MANUFACTURING FABRICATION

FIELD OF THE INVENTION

The embodiments of the invention relate generally to the field of semiconductor processing and, more specifically, relate to an automated analysis system for semiconductor manufacturing fabrication.

BACKGROUND

Large quantities of measurements and data collection are done in a fabrication plant ("fab") based on equipment, process operations, and lots, to name a few examples. The data needs to be converted into meaningful reports consisting of statistical charts and indicators for analyzing process health and detecting process variations. Calculating summary statistics, process capability, and evaluation indicators on these measurements and data is a key qualification process that many organizations perform for every process generation in a fab. These calculations assist in measuring the performance of a process in the fab relative to product requirements, ensuring that the newly-developed process meets any necessary specifications, and certifying that the process is prepared for ramp up.

Currently, several home-grown applications and analysis scripts are utilized to produce the above-mentioned calculations. With these solutions, it can be difficult and time consuming to configure the settings that determine how the indicators are calculated. Furthermore, matching indicators and ensuring consistency between multiple fabs is not an easy job. Performance issues may be encountered due to the need to configure and manipulate a huge amount of data in different fashions. Similarly, it can be difficult to introduce new algorithms without impacting the existing architecture of the system. In addition, if a configuration and analysis library is utilized, it may not provide process engineers with all of the algorithms to analyze the data.

These prior art solutions are considered to be time consuming and unfeasible with the current size of wafers, number of process operations, and the amount of data collected in a typical fab. These solutions may result in calculation mismatches between different areas within a fab or between multiple fabs. Also, users are not able to control the batch jobs or run ad-hoc reports. Furthermore, the prior art solutions have significant data latency until results are produced. This is because they focus on web server and browser-based thin clients. On a daily basis, the data from cross-fabs would be rolled up. In some cases, this may involve 24 hours of data latency.

A solution that offers automatic configuration synchronization, end user control of when they want to schedule their batch jobs or generate ad-hoc reports, interactive charts and indicators, reduced response time, reduced configuration time, and reduced data latency, and an ability to solve generic problems for detecting process variations and equipment matching across multiple fabs would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for an automated analysis system for semiconductor manufacturing fabrication are described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the present invention provide an automated analysis system for semiconductor manufacturing fabrication. Embodiments of the invention define a set of data and how data manipulation operations are performed in order to produce meaningful indicators that inform process engineers about the health of a process in a fabrication plant ("fab").

For instance, multiple measurements or system data may be collected from wafers in a fab, such as core processing, temperatures, thickness, and critical dimension, to name a few examples. In some embodiments, sets of mathematical formulas and algorithms are provided to perform operations and calculations on these collected measurements, such as data screening, filtering, aggregation, on-target indicator (OTI), on-center indicator (OCI), summary statistics, Cpk, Cpd, calculated control limits, percentage out of control, percentage out of disposition, and reference tool matching indicators.

Figure 1:
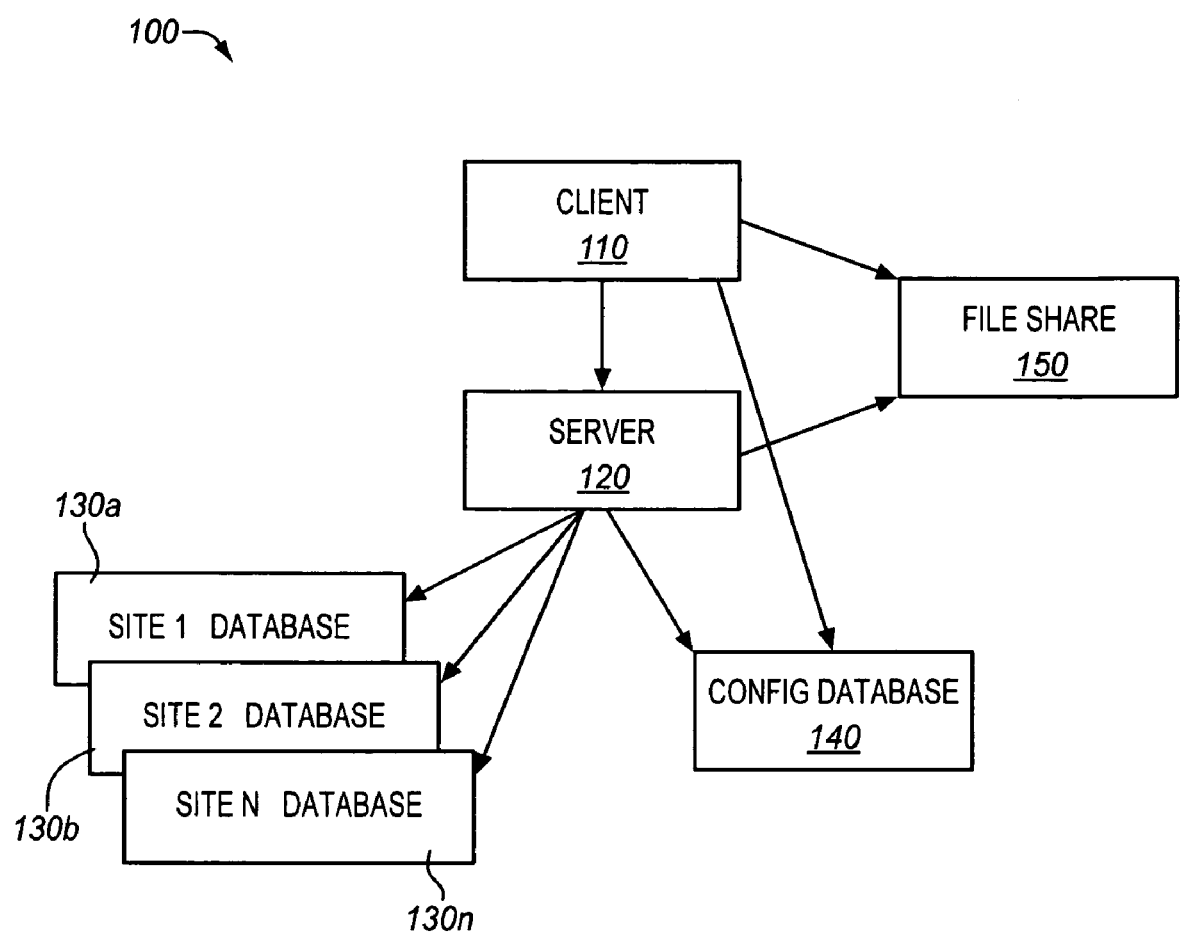
FIG. 1 illustrates a block diagram a system-level view of one embodiment of an automated analysis system for semiconductor manufacturing fabrication.

FIG. 1 is a block diagram illustrating a system-level view of an automated analysis system 100 for semiconductor manufacturing fabrication. As part of semiconductor manufacturing fabrication, vast amounts of system data generated one or more fabs. In one embodiment, this system data may be analyzed by the analysis system in a short time and with minimum configuration overhead to detect process variations and perform equipment matching within a fab and cross-fab. In some embodiments, this system data is process control system (PCS) data.

System 100 includes an analysis system client, an analysis system server 120, multiple site databases 130a-N, a configuration database 140, and a file share 150. Analysis system client 110 may be an end-user's interface to the other components of the analysis system 100 that allows the end user to change configurations, schedule batch reports, generate ad-hoc reports and view batch reports. Analysis system server 120 runs the end user's scheduled reports on a regular basis by making queries against any of the site databases 130a-N. The site databases 130a-N store the system data for each fab where measurements and data are obtained. Each site databases 130a-N may be associated with a single fab and be responsible for storing that fab's system data.

Once the system data is obtained, server 120 may then calculate relevant indicators and generate reports including unique statistical charts with flagging criteria. File share 140 stores the indicators and reports generated by the server 120. File share 140 is then accessible by the client 110 so that the client 110 may obtain these results. Configuration database 150 stores analysis system parameter configuration information utilized by the server 120 in extracting the system data from the site databases 130a-N and generating the indicators and reports.

Analysis system 100 is an analysis software tool whose interaction of components provides many unique capabilities. First, it provides single fab, cross-fab, and reference tool matching reports containing a variety of indicators and statistical charts with color-coded flagging information. These products of the analysis system 100 allow an end user to easily detect process variations and perform equipment matching in short time.

Second, analysis system 100 provides for automated configuration synchronization. In one embodiment, analysis system 100 may create base versions of, for example, 20,000+ configurations related to data extraction and reporting specifications. This allows an end user to spend minimal time in configurations. In one embodiment, the analysis system configuration synchronization process connects to the site databases 130a-N and then analyzes the system data to determine what configurations should be created within the analysis system. Using default properties, the base versions of all the configurations are created. These configurations are also synchronized on a daily basis to update any changes.

Third, analysis system 100 provides the ability to run scheduled batch jobs on servers or ad-hoc reports on clients. This capability provides improved response time, smaller data latency, and faster data analysis decisions by end users. In one embodiment, an end user may choose one or more parameter configurations and set up scheduled batch jobs on servers or generate ad-hoc reports on clients. During report generation, the analysis system 100 may read configuration data for a parameter. Based on this configuration data, the system 100 generates a query that will be run against one or more of the site databases 130a-N using the end user's credentials. If the query is run against multiple databases, then the results are merged together. Unique analysis system indicators and reports are generated for this dataset. In the case of scheduled batch jobs, the results are stored on file share 150 for future perusal by end users.

Figure 2:
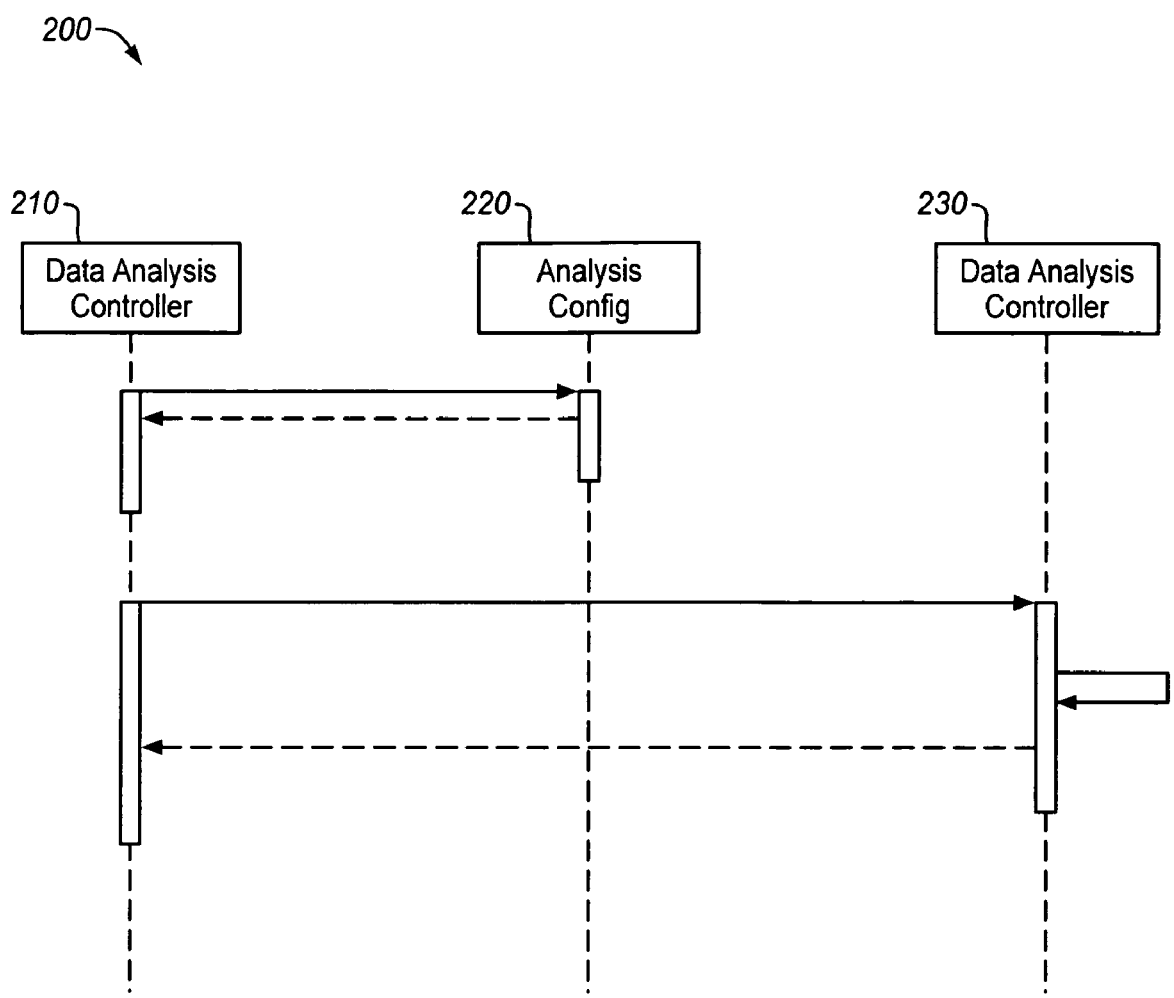
FIG. 2 illustrates a block diagram of one embodiment of a data analysis engine.

FIG. 2 is a block diagram of one embodiment of a data analysis engine utilized in an automated analysis system for semiconductor manufacturing fabrication. In one embodiment, data analysis engine 200 may be a component of analysis system 100 described with respect to FIG. 1. For instance, in one embodiment, data analysis engine 200, may be part of analysis system server 120 described with respect to FIG. 1.

Data analysis engine 200 is a configurable, modular, and scalable data analysis software component that enables the implementation of a set of standard and custom statistical calculations. These calculations may be applied to historical process control data to calculate multi-level summary statistics and indicators. The calculated indicators may then be used to qualify and approve new semiconductor manufacturing processes and to perform cross-fab matching calculations.

Data analysis engine 200 includes a data analysis controller 210, an analysis configuration component 220, and a calculator 230. In one embodiment, data analysis controller 210 controls a flow of the incoming data and instructs the other components of the data analysis engine 200 of which operations to apply on the data and in what order. For instance, data analysis controller 210 controls the data flow based on a level of statistical calculations to be performed on a set of system data, and controls the sequence of operations to be applied to the system data.

Analysis configuration component 220 holds data structures used to contain the values of incoming system data to be analyzed, as well as the final results of the calculations by data analysis engine 200. Analysis configuration component 220 also contains the configuration settings that are used to determine how various algorithms are applied to the system data for desired calculations of indicators.

Calculator 230 defines the algorithms and mathematical formulas that are used in conjunction with the configuration settings. Calculator 230 also applies these algorithms on the incoming system data to generate the resulting indicators. In one embodiment, calculator 230 may be a 4-A statistical process control (SPC) calculator that contains a library of algorithms used to calculate the configured indicators.

Figure 3:
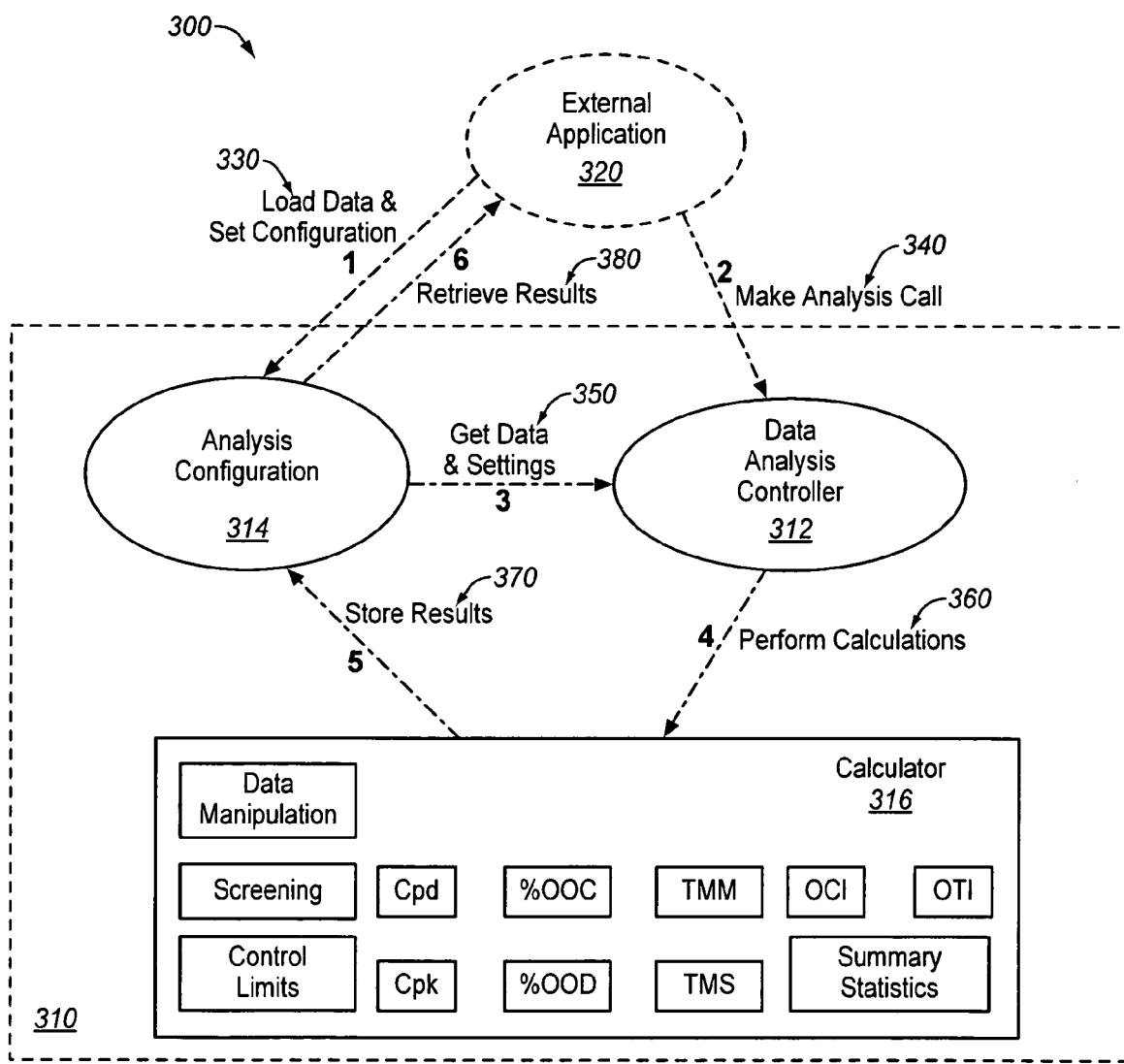
FIG. 3 illustrates a block diagram further illustrating one embodiment of interactions between components of a data analysis engine.

FIG. 3 is a block diagram further illustrating the interaction of components of a data analysis engine in an automated analysis system for semiconductor manufacturing fabrication. In some embodiments, data analysis engine 310 interacts with an external application 320. In one embodiment, data analysis engine 310 is the same as data analysis engine 200 described with respect to FIG. 2. External application 320 may be a product designed to obtain various statistics regarding the measurements and data output from a fab. In some embodiments, external application 320 may be analysis system server 120 of FIG. 1.

Data analysis engine 310 is used to summarize and calculate statistical values of raw system data for parameters measured across a fab. The summarized data is then used to calculate a higher level of indicators such as data screening, filtering, aggregation, OTI, OCI, summary statistics, Cpk, Cpd, calculated control limits, percentage out of control (% OOC), percentage out of disposition (% OOD), reference tool matching indicators, and configurable items such as process tool, product, and route. As illustrated, these indicators are generally depicted in calculator 316.

Data analysis engine 310 consists of several components that have different responsibilities in terms of data manipulation and calculations. Data analysis engine 310 includes a data analysis controller 312, an analysis configuration component 314, and a SPC calculator 316. In one embodiment, these components are the same as their counterparts described with respect to FIG. 2. The interactions of external application 320 and the components 312, 314, 316 of data analysis engine 310 are depicted in the present illustration.

At interaction 330, analysis configuration component 314 loads system data and sets the configuration based on information obtained from the external application 320. Then, at interaction 340, the data analysis controller 312 makes an analysis call based on the information from the external application 320. Data analysis controller 312 also obtains the data and configuration settings from analysis configuration 314 at interaction 350.

Then, at interaction 360, calculator 316 performs calculations based on the system data and configuration settings sent from data analysis controller 312 and analysis configuration component 314. The results of the calculations at calculator 316 are stored in analysis configuration component 314 at interaction 370. Finally, the external application 320 retrieves the results of the calculations from analysis configuration component 314 at interaction 380. In some embodiments, applicant programming interfaces (API's) may be utilized to contain arguments consisting of spreadsheet form data structures, custom analysis configuration objects, and function settings in the form of variable size arrays.

Data analysis engine 200 and 310 described with respect to FIGS. 2 and 3, respectively, improves the quality and accuracy of the calculated indicators for an automated analysis system for a semiconductor manufacturing fabrication plant. The data analysis engine reduces engineering time to analyze the huge amount of data and derive conclusions. Data analysis engine further reduces the processing time for obtaining results to the order of minutes (depending on the size of data), rather than days. Furthermore, data analysis engine may also provide consistency and standardization between multiple areas and fab sites in the calculation of process and matching indicators. This is achieved by encapsulating the system data set and corresponding configuration settings in a single analysis configuration object in order to avoid confusion or misconfiguration of the calculated indicators.

Data analysis engine is also modular in a way that allows the implementation of additional algorithms, without any architecture modifications and without impacting the existing code for algorithms. This structuring reduces the time and effort for integration and testing of system data from fab sites. It also makes it easier and faster to include additional algorithms if requested by end users. Data analysis engine may also be capable of working with system data from different domains that are of different formats and have different configuration settings.

Figure 4:
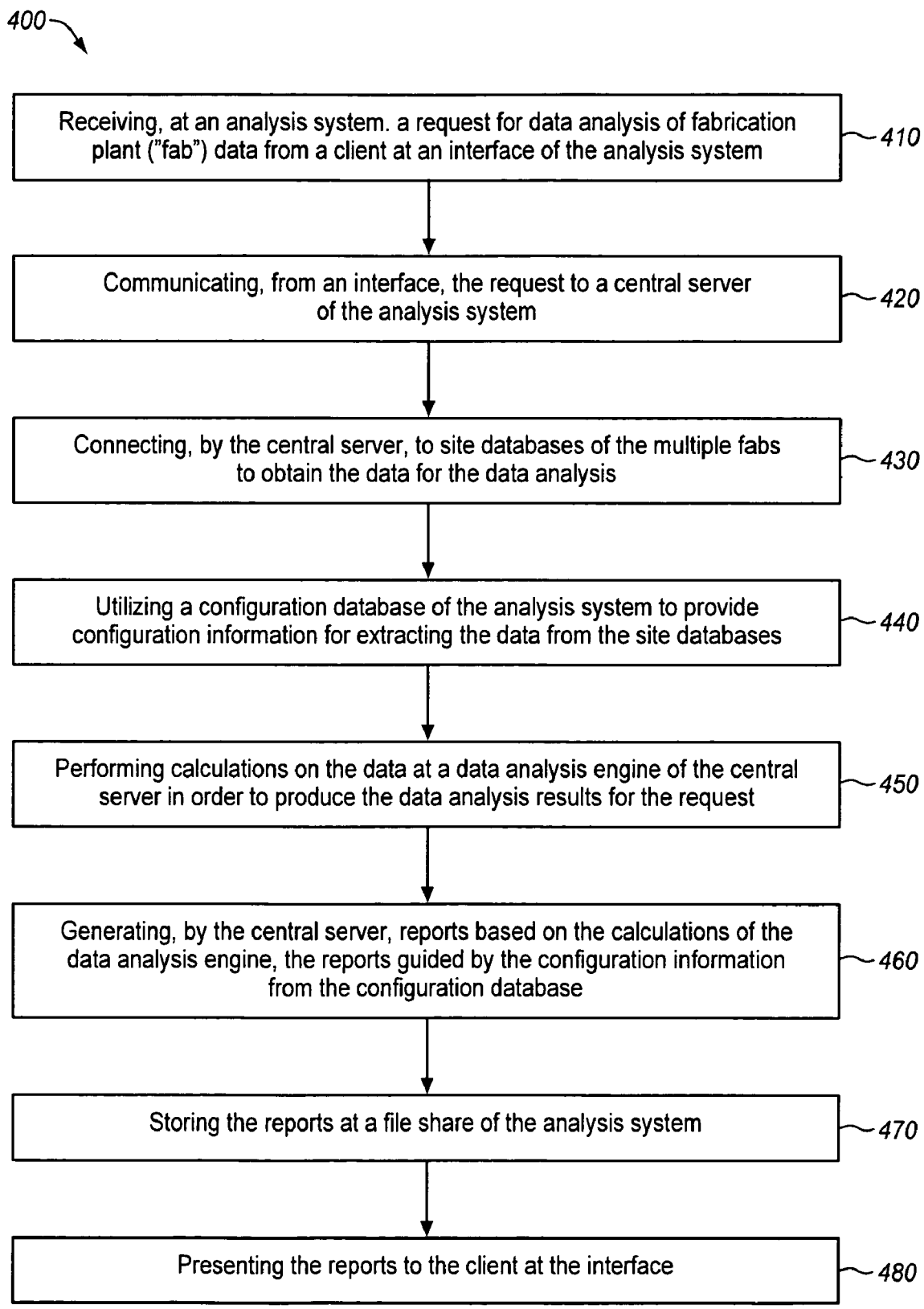
FIG. 4 is a flow diagram of a method of one embodiment of the invention.

FIG. 4 is a flow diagram depicting a method of one embodiment of the invention. Process 400 provides an automated analysis system for semiconductor manufacturing fabrication. Process 400 begins at processing block 410, where an analysis system receives a request for data analysis of fab system data from a client at an interface of the analysis system. In one embodiment, the analysis system is the same as system 100 described with respect to FIG. 1. Then, at processing block 420, the request is communicated from the interface to a central server of the analysis system.

At processing block 430, the central server connects to one or more site databases of multiple fabs to obtain the data for the data analysis request. At processing block 440, a configuration database of the analysis system is utilized to provide configuration information for extracting the data from the site databases. Then, calculations are performed on the data at a data analysis engine of the central server in order to produce the data analysis results for the request. In one embodiment, the data analysis engine is the same as data analysis engines 200 and 310 described with respect to FIGS. 2 and 3, respectively.

At processing block 460, the central server generates reports based on the calculations of the data analysis engine. These reports are guided by the configuration information from the configuration database. At processing block 470, the reports are stored at a file share of the analysis system. Then, at processing block 480, the reports are presented to the client at the interface in response to the client's request.

Figure 5:
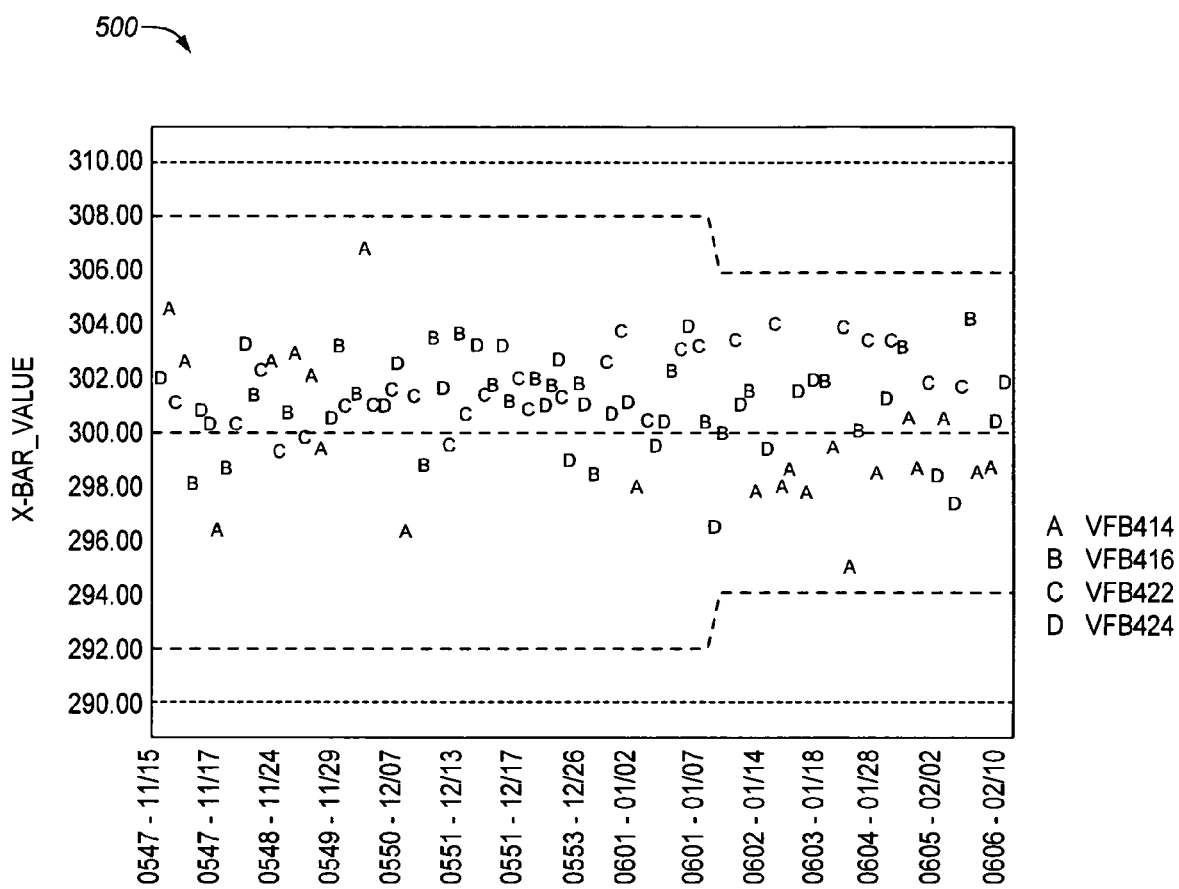
FIG. 5 is a graphical depiction of an exemplary report generated by an analysis system of embodiments of the invention.

FIG. 5 is a graphical depiction of an exemplary report generated by an analysis system of embodiments of the invention. Report 500 may be produced by the analysis system server 120 of FIG. 1. Report 500 may represent the results of calculations performed by the data analysis engine 210 or 300 described with respect to FIGS. 2 and 3, respectively. For instance, the data plots in report 500 may represent indicators such as data screening, filtering, aggregation, OTI, OCI, summary statistics, Cpk, Cpd, calculated control limits, % OOC, % OOD, reference tool matching indicators, and configurable items such as process tool, product, and route.

Figure 6:
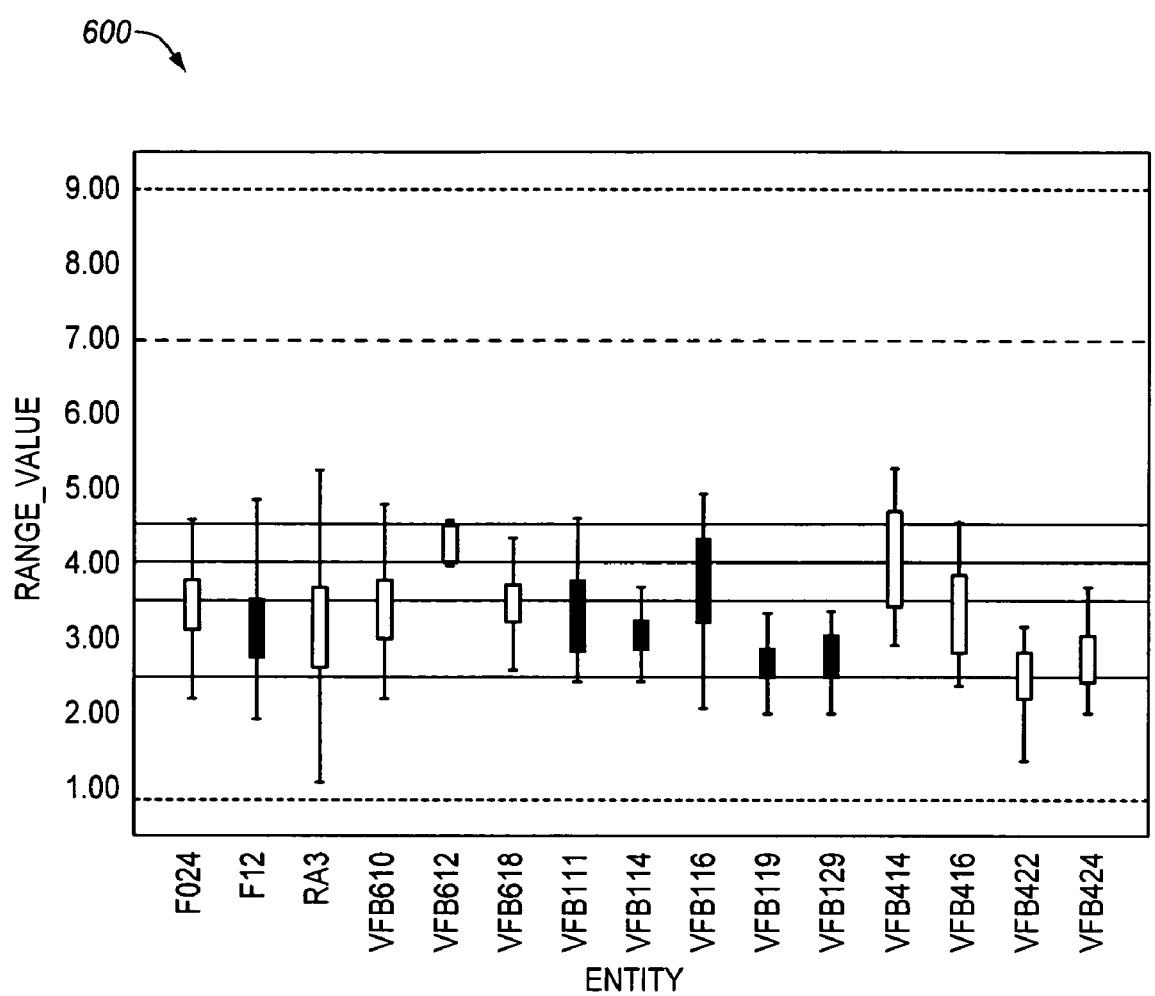
FIG. 6 is a graphical depiction of another exemplary report generated by an analysis system of embodiments of the invention.

FIG. 6 is a graphical depiction of another exemplary report generated by an analysis system of embodiments of the invention. Report 500 may be produced by the analysis system server 120 of FIG. 1. Report 600 may be utilized to represent cross-fab comparison of particular indicators for the fabs. These indicators may be the result of calculations performed by the data analysis engine 210 or 300 described with respect to FIGS. 2 and 3, respectively. The cross-fab comparison in report 600 is useful for provided a standardized medium for fair comparisons of fabs.

Figure 7A:
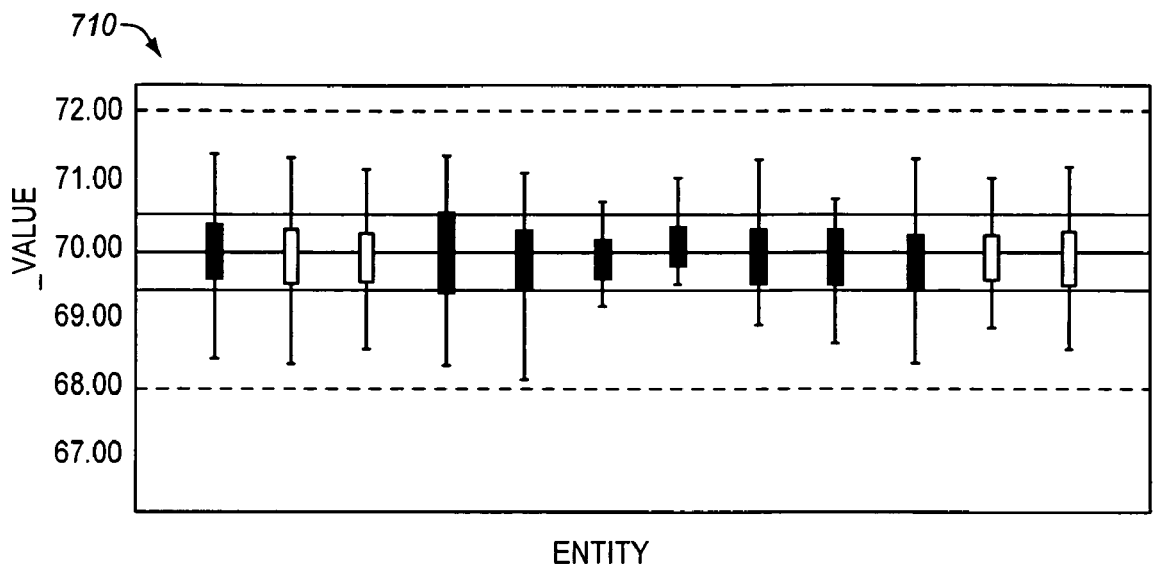
FIG. 7A is a further graphical depiction of an exemplary report generated by an analysis system of embodiments of the invention.
Figure 7B:
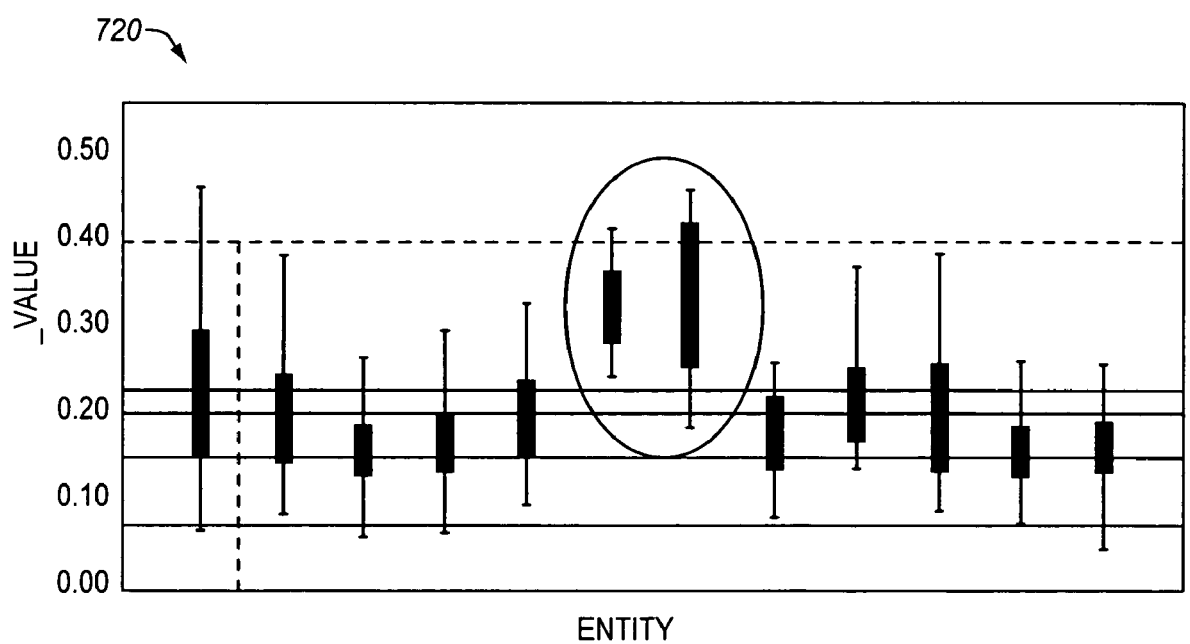
FIG. 7B is yet a further graphical depiction of an exemplary report generated by an analysis system of embodiments of the invention.

FIGS. 7A and 7B are further graphical depictions of exemplary reports generated by an analysis system of embodiments of the invention. Similar to report 600 of FIG. 6, reports 710 of FIG. 7A and 720 of FIG. 7B represent cross-fab comparisons of indicators for the fabs. Report 710 depicts a well-matched distribution across all equipment in a virtual factory and development fab. On the other hand, report 720 depicts a situation where some equipment in a virtual factory and development fab is not matched.

Figure 8:
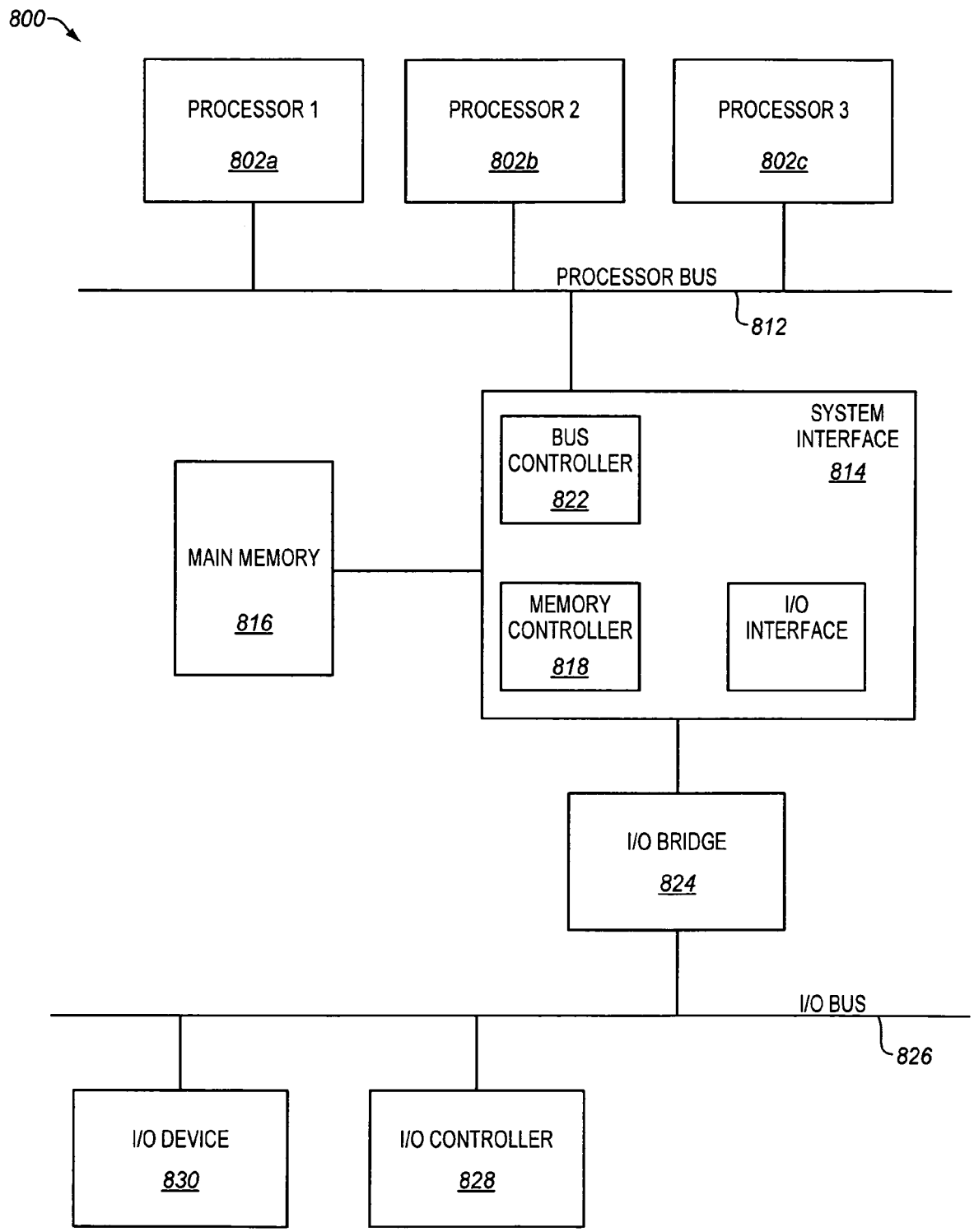
FIG. 8 illustrates a block diagram of one embodiment of a computer system.

FIG. 8 is a block diagram illustrating an exemplary computer system (system) 800 used in implementing one or more embodiments of the invention. Components of FIGS. 1 through 3 may be implemented as system 800 or as components of system 800. System 800 includes one or more processors 802a-c. The processors 802a-c may include one or more single-threaded or multi-threaded processors. A typical multi-threaded processor may include multiple threads or logical processors, and may be capable of processing multiple instruction sequences concurrently using its multiple threads.

Processors 802a-c may also include one or more internal levels of cache and a bus controller or bus interface unit to direct interaction with the processor bus 812. As in the case of chip multiprocessors or multi-core processors, processors 802a-c may be on the same chip. The chip may include shared caches, interprocessor connection networks, and special hardware support such as those for SPT execution (not shown). Furthermore, processors 802a-c may include multiple processor cores. Processor bus 812, also known as the host bus or the front side bus, may be used to couple the processors 802a-c with the system interface 814.

System interface 814 (or chipset) may be connected to the processor bus 812 to interface other components of the system 800 with the processor bus 812. For example, system interface 814 may include a memory controller 818 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. For example, as illustrated, the I/O interface 820 may interface an I/O bridge 824 with the processor bus 812. I/O bridge 824 may operate as a bus bridge to interface between the system interface 814 and an I/O bus 826. One or more I/O controllers and/or I/O devices may be connected with the I/O bus 826, such as I/O controller 828 and I/O device 830, as illustrated. I/O bus 826 may include a peripheral component interconnect (PCI) bus or other type of I/O bus.

System 800 may include a dynamic storage device, referred to as main memory 816, or a random access memory (RAM) or other devices coupled to the processor bus 812 for storing information and instructions to be executed by the processors 802a-c. Main memory 816 may also be used for storing temporary variables or other intermediate information during execution of instructions by the processors 802a-c. System 800 may include a read only memory (ROM) and/or other static storage device coupled to the processor bus 812 for storing static information and instructions for the processors 802a-c.

Main memory 816 or dynamic storage device may include a magnetic disk or an optical disc for storing information and instructions. I/O device 830 may include a display device (not shown), such as a cathode ray tube (CRT) or liquid crystal display (LCD), for displaying information to an end user. I/O device 830 may also include an input device (not shown), such as an alphanumeric input device, including alphanumeric and other keys for communicating information and/or command selections to the processors 802a-c. Another type of user input device includes cursor control, such as a mouse, a trackball, or cursor direction keys for communicating direction information and command selections to the processors 802a-c and for controlling cursor movement on the display device.

System 800 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 800 may be coupled with a number of clients and/or servers via a conventional network infrastructure, such as a company's intranet and/or the Internet, for example.

It is appreciated that a lesser or more equipped system than the example described above may be desirable for certain implementations. Therefore, the configuration of system 800 may vary from implementation to implementation depending upon numerous factors, such as price constraints, performance requirements, technological improvements, and/or other circumstances.

It should be noted that, while the embodiments described herein may be performed under the control of a programmed processor, such as processors 802a-c, in alternative embodiments, the embodiments may be fully or partially implemented by any programmable or hardcoded logic, such as field programmable gate arrays (FPGAs), transistor transistor logic (TTL) logic, or application specific integrated circuits (ASICs). Additionally, the embodiments of the invention may be performed by any combination of programmed general-purpose computer components and/or custom hardware components. Therefore, nothing disclosed herein should be construed as limiting the various embodiments of the invention to a particular embodiment wherein the recited embodiments may be performed by a specific combination of hardware components.

In the above description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the invention. It will be appreciated, however, to one skilled in the art that the embodiments of the invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in a carrier wave or other propagation medium via a communication link (e.g., a modem or network connection).

Similarly, it should be appreciated that in the foregoing description, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A system, comprising:
one or more site databases that each store data generated by an associated one or more semiconductor fabrication plants;
a configuration database; and
a server communicatively coupled to the one or more site databases and the configuration database, the server to analyze the data from the one or more site databases upon a request by a client, the data to be analyzed based on configuration settings in the configuration database that provide uniform configuration synchronization for applying algorithms to the data.

2. The system of claim 1, wherein the server to generate one or more reports based on the results of the analyzed data, the reports provided to the client in response to the request.

3. The system of claim 1, further comprising an interface communicatively coupling the server and the client to allow the client to perform at least one of changing the configuration settings, scheduling batch reports, generating ad hoc reports, and viewing batch reports.

4. The system of claim 1, further comprising a file share component to store the generated reports from the server to be accessible by the client.

5. The system of claim 2, wherein the configuration settings stored in the configuration database provide information used by the server to extract the data from the one or more site databases and to generate the reports.

6. The system of claim 2, wherein the server includes a data analysis engine to perform the data analysis, the data analysis engine including:
a data analysis controller to control incoming data from the server and to determine a sequence of operations to be performed on the data;
an analysis configuration component to hold a data structure that contains values of the incoming data and to hold settings used to determine how one or more algorithms are applied to the incoming data; and
a calculator to perform the one or more algorithms on the incoming data according to the settings in order to calculate one or more indicators that are summarized by the server in the reports.

7. The system of claim 6, wherein the one or more indicators include at least one of data screening, filtering, aggregation, on-target indicator (OTI), on-center indicator (OCI), summary statistics, Cpk, Cpd, calculated control limits, percentage out of control, percentage out of disposition, reference tool matching, process tool matching, product matching, and route matching.

* * * * *